(No Model.)
E. W. QUINCY.
CHECK ROW CORN PLANTER.
No. 294,269. Patented Feb. 26, 1884.
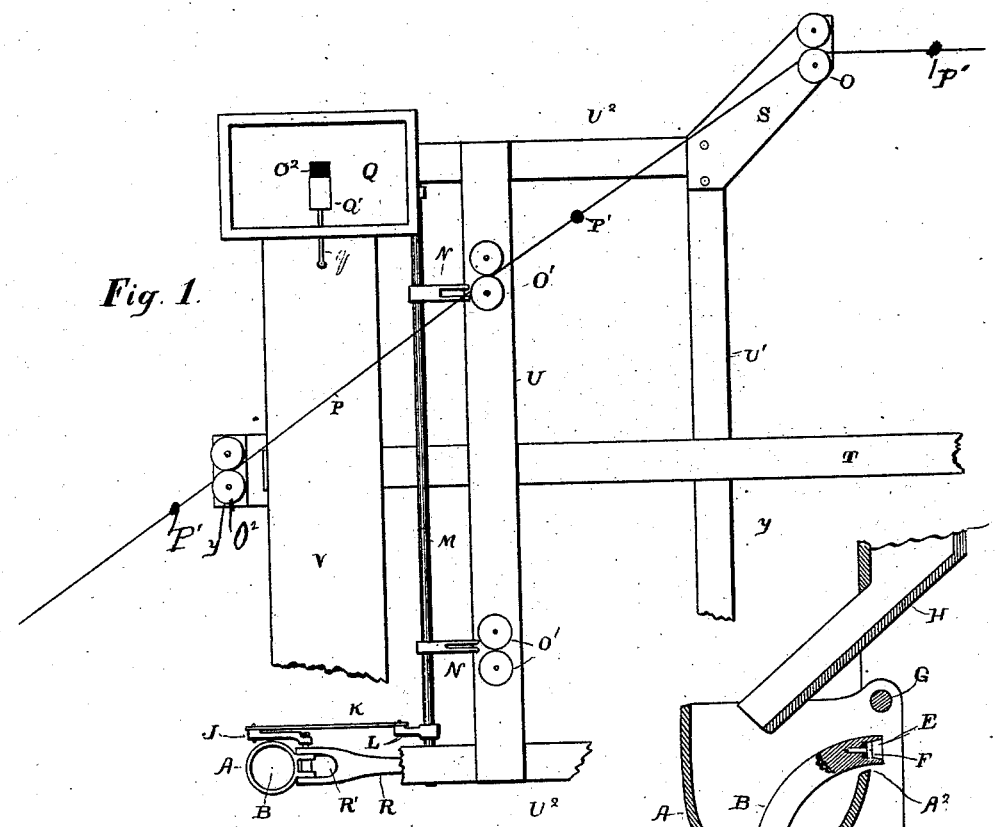
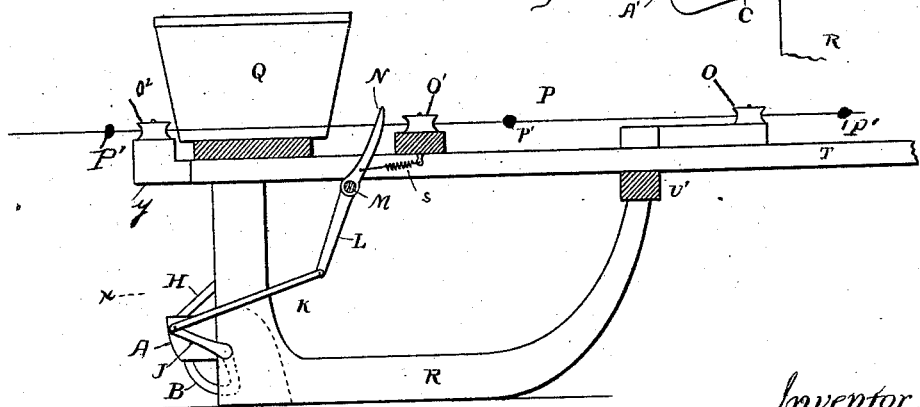
Witnesses:
Geo Rundel.
J. Buchanan
Inventor,
Edmund W. Quincy
per Jno. L. Condon
Attorney in fact.

UNITED STATES PATENT OFFICE.

EDMUND W. QUINCY, OF PEORIA, ILLINOIS.

CHECK-ROW CORN-PLANTER.

SPECIFICATION forming part of Letters Patent No. 294,269, dated February 26, 1884.

Application filed September 5, 1883. (No model.)

*To all whom it may concern:*

Be it known that I, EDMUND W. QUINCY, a citizen of the United States, residing at Peoria, in the county of Peoria and State of Illinois, have invented certain new and useful Improvements in Check-Row Corn-Planters, of which the following is a specification, reference being had therein to the accompanying drawings.

My invention relates to that class of machines which are known as "check-row corn-planters," and particularly to pivoted-cup machines, certain features of my invention being applicable to check-row planters generally, and other features thereof relating exclusively to pivoted-cup machines.

The objects of my invention are, first, to so arrange the parts of the machine that the check-row cord or line shall enter the machine at one side of and clear from the team, and shall pass thence in a direct line diagonally across the machine-frame, whereby the progress of the team drawing the machine shall be unimpeded by the check-line, and whereby, also, the resistance of the check-line to the progress of the machine shall be reduced to the minimum; secondly, the object of my invention is to so arrange the seeding mechanism that its members actuated by said diagonally-arranged check-line shall be operated thereby in a direct and positive manner; thirdly, my invention relates to a peculiar and novel arrangement, in a pivoted-cup seeder, for delivering a regulated quantity of seed at each discharging movement of the seeding devices.

To the above ends my invention consists in a machine constructed and arranged in the manner substantially as hereinafter described and claimed.

In order that my invention may be fully understood, I will proceed to describe it with reference to the accompanying drawings, in which—

Figure 1 is a plan view of my improved machine. Fig. 2 is a vertical longitudinal section of the same. Fig. 3 is a vertical longitudinal section of the seed-dropping devices.

In the said drawings, U, U', U², and V designate the vehicle-frame, and R designates one of the shoes (of which there are two—one at either side of the vehicle) upon which the said frame is mounted.

T designates the tongue, to which the team is hitched.

P designates the check-row line, which is stretched across the field, and P' designates the knots, projections, or enlargements upon said line. Upon each of the two forward corners of the frame is mounted a bracket, S, (one of which is shown in Fig. 1,) which projects obliquely outward and forward, as shown, and upon the outer end of which is mounted a pair of sheaves or pulleys, O, between which passes the line P. Upon the transverse beam U of the frame are two pairs of sheaves, O O', each pair being situated near one extremity of said beam, as shown, and the line P passes from the sheaves O diagonally across the frame and between the sheaves O'.

O² designates a similar pair of sheaves, mounted upon the rear beam, V, of the frame, between which pulleys or sheaves the line P passes diagonally from the sheaves O', and from thence between a similar set of sheaves or pulleys mounted on a sulky-follower. (Not here shown.) Thus it will be seen that the pulleys or sheaves are arranged in such a way that the wire P passes into the machine parallel to the tongue T, but entirely clear of the team, and, furthermore, that by this arrangement the twisting strain upon the machine is greatly decreased.

M designates a rock-shaft, which is set transversely of the vehicle-frame in front of the rear beam, V, and between it and the beam U. This shaft carries two rigidly-attached arms or forks, N, having bifurcated and tapering upper ends, as shown. The line P passes between the bifurcated end of either arm, and the knots P' ride over its tapered portion after having thrown said bar or fork backward, as hereinafter described. Each bar or fork N is connected with the transverse beam U by a spring, S, which serves to retract said fork to its normal position after the passage of the knots P'.

L designates an arm or bar rigidly attached to the shaft M, and extending normally downward and rearward from said shaft. At its lower end the arm L is jointed to one end of a link, K, the opposite end of which is similarly jointed to a crank-arm, J, rigidly secured to the extremity of a short rock-shaft, D, set transversely behind the shoe R. Upon the rear side of each shoe R is secured a cup, A, having an aperture, A', in its bottom, and a mouth, A², at its forward side. The cups A are attached to the shoes by a rod, G, extending transversely of the machine from shoe to shoe, and also by the shafts D, as indicated in Fig. 3.

H designates a spout, which extends upward from the cup A to the shank of the shoe R. Upon each extremity of the transverse beam V is mounted a hopper or seed-box, Q, one of which is shown in Fig. 1, and said boxes are each provided with an aperture, Q², in its bottom, which aperture is covered by a slide, Q', having a stem, $q$, by which the position of the slide is regulated. The seed passes through the apertures Q² of the hoppers and is directed by the shanks of the shoes R and by the spouts H to the cups A.

B designates a finger-bar, which is rigidly secured by its shank C to the short shaft D, and passes upward into the cup A through the aperture A'. At its upper end the finger B is formed with a cavity, E, to receive the seed from the cup or spout.

In order to regulate the capacity of the cavity E to accord with different kinds of seed, or different quantities of the same kind of seed, to be planted, a screw, F, is inserted into said cavity E, the head of said screw being of such size as to accurately fit the cavity, and the shank of said screw passing from the bottom of the cavity into the finger B. Thus the head of the screw F constitutes a false bottom for the cavity E, so that by turning the screw in one direction the depth of the cavity is lessened, and by turning said screw in the opposite direction the depth of the cavity is increased.

In order that this description may be perfectly clear, only one of the dropping mechanisms is described. There are two, however, both being precisely alike.

The operation of the above-described machine is as follows: The check-line P is strung across the field, and is placed between the sheaves O O' O² and between the bifurcations of one of the forks N, such line passing also between the sheaves upon the sulky-follower. (Not shown.) The team is hitched to the pole or tongue T, and draws the machine along the field. As before stated, it will be seen that the team is always clear of the line P, which is not the case where the line passes between the team. As the machine is thus drawn along, the knots P' come successively in contact with the forward side of the fork N, throwing it backward, and then escaping past it. Each backward movement, acting through the medium of rock-shaft M, arms L, and links K, serves to rock the short shafts D a quarter-turn, and imparts to the finger B a corresponding movement forward, by which means the charge of seed is thrown out of the mouths A² of the cups A and downward upon the ground, the amount of seed delivered by the finger at each movement thereof being regulated by the adjustment of screw F. After each knot has thus acted upon and escaped past the fork N, the latter is retracted to its normal position by the spring S, and the fingers B are correspondingly retracted, in readiness to receive a new charge. The slides Q' are to be so set that the quantity of seed delivered to the fingers B will correspond to the quantity of seed which the cavities of said fingers will contain at the given time.

Without intending to confine myself exclusively to the precise details of construction here shown and described, for my invention is capable of various modifications, what I claim as new, and desire to secure by Letters Patent, is—

1. The combination, with the machine-frame, of the line-guiding sheaves arranged diagonally upon said frame in line one with the other, whereby the check-line may be conducted in a direct line diagonally across the machine.

2. The combination, with the machine-frame, of the line-guiding sheaves O O² and intermediate guiding-sheaves, O', arranged diagonally upon said frame, and the rock-shaft, carrying the rock-arms, arranged relatively to the sheaves O', to be engaged positively by the diagonally-passing check-line.

3. The combination, with the machine-frame, the line-guiding sheaves, and the rock-shaft carrying the rock-arms, of the pivoted cup secured upon a counter-shaft, the seed-cup, and the seed hopper and spout, substantially as and for the purposes set forth.

4. The combination, with the frame, the projections or brackets S, carrying sheaves O, the sheaves O', mounted upon said frame, and the bracket carrying the sheaves O², of the rock-shaft M, the rock-arms L N, the spring $s$, the link K, shaft D, arm J, cup A, and the seed-cup B C F, substantially as and for the purposes described.

In testimony whereof I affix my signature in presence of two witnesses.

EDMUND W. QUINCY.

Witnesses:
WALTER S. LOWER,
ALBERT G. WEBBER.